United States Patent Office 3,542,647
Patented Nov. 24, 1970

3,542,647
METHOD FOR PRODUCING L-ASPARAGINASE
Peter P. K. Ho, Carmel, and La Verne D. Boeck, Indianapolis, Ind., assignors to Eli Lilly and Company, Indianapolis, Ind., a corporation of Indiana
No Drawing. Filed Aug. 14, 1968, Ser. No. 752,466
Int. Cl. C07g 7/028
U.S. Cl. 195—66                                  1 Claim

ABSTRACT OF THE DISCLOSURE

An improved method for producing L-asparaginase by fermentation, comprising aerobically fermentating *E. coli* in a nutrient medium for a period of about 6–10 hours, then anaerobically aging the fermentation mixture for about 1 hour prior to harvest of the asparaginase-containing cells.

BACKGROUND OF THE INVENTION

L-asparaginase has now been well established as an effective anti-tumor agent [see for example Campbell, Biochem., 6, 721 (1967)]. The enzyme has been obtained from guinea pig serum and has also been isolated from *Escherichia coli* B cells by Mashburn and Wristin, Archiv. Biochem. Biophys., 105, 450 (1964). The latter investigators demonstrated that the enzyme exhibits the same activity when isolated from *E. coli* B as when isolated from guinea pig serum. Schwartz et al., Proc. Nat. Acad. Sci., U.S.A., 56, 1516 (1966), found that *E. coli* cells contained two L-asparaginase forms having similar enzyme activity, but only one of these, designated by Campbell, loc. cit., as EC II, demonstrates all of the anti-tumor activity attributable to L-asparaginase. Much of the early work with the enzyme has been directed toward the recovery of L-asparaginase from *E. coli* B grown aerobically for about 18 hours, although Schwartz, et al. loc. cit. disclose a two-step fermentation consisting of a short aerobic growth and a 20 minute anaerobic aging at room temperature.

It is an object of this invention to provide an improved method for the fermentation of *E. coli* B cells.

It is a further object of this invention to provide an improved method for the fermentation of *E. coli* B containing the L-asparaginase form designated EC II.

Other objects of this invention will become apparent to those skilled in the art from the following description.

SUMMARY OF THE INVENTION

The objects of this invention are fulfilled by fermenting a strain of the organism *E. coli*, of which A.T.C.C. 13706 is a typcial member, in a nutrient medium under standard aerobic conditions for about 5 to 10 hours, then allowing the fermentation mixture to age under anaerobic conditions for about one hour prior to harvest of the cells and extraction and isolation of the desired L-asparaginase thereform.

DETAILED DESCRIPTION

By the process of this invention there is provided an improved method for growing *E. coli* B cells from which can be isolated L-asparaginase possessing high enzymatic activity and high oncolytic activity against a standard test tumor system. The first step of the process comprises fermentation of *E. coli* in a nutrient medium for from about 5 hours to about 10 hours, preferably for from about 6 hours to about 8 hours, under aerobic condition. The yield of enzyme increases with time until the late-log stage at about 10 hours then falls precipitously. The fermentation is carried out at a temperature somewhat above the minimum temperature at which fermentation of *E. coli* can occur. A suitable temperature is from about 30° to about 40° C., preferably about 37° C. During the fermentation the broth should be sparged with filtered air at a rate of from about 0.2 to about 1.0 volume of air per volume of medium per minute (v./v./m.). Additional agitation is provided by stirring at about 200 to about 600 revolutions per minute.

After the short fermentation cycle, agitation is reduced or discontinued, aeration is discontinued, and the broth is aged under anaerobic conditions for about 30 minutes to about 90 minutes, preferably about 60 minutes at about 37° C. at an initial pH between about pH 7 and about pH 8. The desired pH level is attained by the addition of potassium dibasic phosphate. The broth is then quickly cooled to about 20° C. to quench the fermentation prior to harvesting the cells containing the L-asparaginase.

A nutrient medium useful for the process of this invention contains about 25 to about 45 g. per liter of trypticase soy broth, about 2.5 to about 10 g. per liter of glucose, and a trace to about 2 g. per liter of L-asparagine as an aqueous broth. Alternatively, in large fermentors, the medium can comprise an aqueous solution containing 0.75% glucose, 1.7% hydrolyzed casein (HyCase Amino Sheffield), 0.3% soy peptone, 0.1% L-asparagine, and 0.25% potassium dibasic phosphate on a weight per volume basis.

At the beginning of the fermentation, or at any time prior to the aging period, additional nutrient in the form of glycolyzable carbohydrate must be introduced. The amount added must be such that at the beginning of the anaerobic aging period the amount of available glycolyzable carbohydrate is between about 2.5 and about 8 g. per liter. Presence of the required amount of glycolyzable carbohydrate at the proper time is most readily assured by adding from about 2.5 to about 8 g. per liter of the carbohydrate to the fermentation medium at a time just prior to the aging period. Pentoses and hexoses and dimeric derivatives thereof can be used as glycolyzable carbohydrates. Suitable carbohydrates include allose, altrose, arabinose, cellobiose, fructose, fucose, galactose, glucose, lyxose, maltose, manose, raffinose, rhamnose, ribose, sorbose, talose, xylose, and the like.

In large-scale fermentations, the anaerobic aging period can be shortened to about 30 to about 40 minutes without adversely affecting the yield or quality of the product. In all cases, the fermentation is quickly quenched by external cooling to about 20° C. after aging and prior to harvest.

Harvesting of the cells is effected by adding a flocculating agent, diatomaceous earth or the like, to the fermentation mixture, filtering the mixture, washing the filter cake to remove spent media, and drying the cake. The active enzyme is released from the cells comprising the cell cake by resuspending the cell cake in water and treating the resulting suspension with high frequency sound waves. Alternatively, the enzyme can be released from the cells by treatment with lysozyme by the methods of Campbell loc. cit., or by alternate freezing and thawing the aqueous cell cake to disrupt the cell structure.

The L-asparaginase assays empoyed for determining the activity of the product are carried out according to the procedures of Campbell, loc. cit. For the standard assay serial amounts of 1 to 100 λ of undiluted sample of the test solutions were added to 1 ml. of 0.02 M L-asparagine and 1 ml. of 0.2 M sodium acetate buffer (pH 5.0). The aspartate liberated by the resulting enzyme reaction was separated by high voltage electrophoresis in pyridine-acetate buffer at pH 6.3 on a cellulose carrier. For example twenty lambda of the sample were applied onto the buffer-treated Whatman No. 1 paper and the electrophoresis was carried out at 2,000 mv. for 30 minutes. The paper was dried in the oven for 10 minutes, then stained with ninhydrin reagent to give dark blue spots corresponding to aspartate. The density of the spots was determined by a densitometer. Assays on standard concentrations of aspartate and controls containing only the reagents without the added test solution to measure aspartate other than that released by enzyme activity were carried out with each test. Results were reported in International Units (I. U.), the quantity of enzyme needed to release 1 micromole of aspartate per minute at the maximum rate.

EXAMPLE I

An aqueous fermentation medium having the following composition was prepared:

7.5 g./liter dextrose,
17 g./l. hydrolyzed casein,
3 g./l. soy peptone,
2.5 g./l. sodium chloride,
1 g./l. L-asparagine, and
2.5 g./l. potassium dibasic phosphate.

An inoculum of *E. coli* B was prepared in the following manner. Fifty-five milliliters of the above medium was measured into a 250 ml. shake flask. The medium was sterilized, adjusted to pH 7.3, and inoculated with a slant growth of *E. coli* B. Agitation of the shake flask was effected by rotation at 275 r.p.m. through an arc of one inch diameter. After 17 hours of growth at 37° C., 10 ml. of the inoculum so prepared was used to inoculate a 100 liter fermentor containing 24 l. of a medium having the above composition. The inoculated fermentation mixture was stirred at 420 r.p.m. and air was supplied to the mixture by sparging at the rate of 0.35 v./v./min. The initial pH of the fermentation was pH 7.2 After 8 hours the pH of the mixture was adjusted to pH 7.7 by the addition of 17.4 g. of potassium dibasic phosphate per liter of medium and sparging with air was discontinued. The fermentor was closed, and stirring was continued under anaerobic conditions in the closed fermentor for 60 minutes. The reaction was then quenched by quickly cooling the contents of the fermentor to 20° C. The fermentation mixture was centrifuged in an air-driven Sharple centrifuge and the cell paste was collected. Cell yield: 18.6 g./l. activity: 167 I.U./g.

EXAMPLE II

A 2 liter inoculum, prepared as in Example 1, was used to inoculate a 1000 gallon fermentor containing 946 liters of an aqueous nutrient medium containing 0.75% (w./v.) glucose, 1.7% HyCase Amino (Sheffield), 0.3% soy peptone, 0.1% L-asparagine, and 0.25% dibasic potassium phosphate. Fermentor conditions at the beginning of the fermentation were as follows:

Dissolved $O_2$: 90% saturation
Sparging rate: 0.25 v./v./m.
Stirring: 275 r.p.m.
pH at the time of inoculation: 6.8–7.0

Aerobic fermentation was carried out for 6½ hours, during which time sodium hydroxide was added at 45-minute intervals as needed to maintain the pH at the initial pH. The manhole on the fermentor was then opened and 34.7 g./l. of potassium dibasic phosphate and 8.7 g./l. of glucose was added. Stirring was reduced to 50 r.p.m., sparging with air was discontinued and the mixture was held under anaerobic conditions for 45 minutes. After the anaerobic aging, the contents of the fermentor were cooled to 17° C., diatomaceous earth and a flocculating agent (PRIMA FLOC C-7, Rohm and Haas) were added and the whole was filtered. Yield: 37 g./l. Activity: 70.0 I.U./g. The L-asparaginase was recovered from the cells by the following procedure. The cells were resuspended in water, and the resulting suspension was treated with high frequency sound waves to rupture the cell walls. The mixture was adjusted to pH 5 and filtered to remove the cellular debris. The filtrate was adjusted to pH 8 and solid ammonium sulfate was added to provide a 45% (w./v.) concentration thereof. The mixture was filtered, the residue was discarded, and more solid ammonium sulfate was added to provide a final concentration of 80% (w./v.). The resulting mixture was filtered and the residue was suspended in $10^{-3}$ M aqueous ammonium bicarbonate solution and dialyzed overnight. One volume of ethanol was added, the mixture was filtered and a second volume of ethanol was added to the filtrate. The resulting mixture was filtered and the collected solid residue was dissolved in $10^{-3}$ M ammonium bicarbonate and freeze-dried. The powder so obtained was resuspended in water and solid ammonium sulfate was added to provide a concentration of 45% (w./v.). The resulting mixture was filtered, additional ammonium sulfate was added to the filtrate to a final concentration of 80% and the mixture was again filtered. The collected solid residue was dissolved in $10^{-3}$ M ammonium bicarbonate, dialyzed overnight and freeze dried to yield the final L-asparaginase preparation.

In order to determine that the cells grown by the process of this invention contain the desired L-asparaginase EC II, the anti-tumor activity of the product isolated was tested by the following experiment. Gardner lymphosarcoma, a solid nonmetastasizing tumor was implanted subcutaneously by trocar into the axillary region of mice. Treatment was begun 24 hours after implantation and the animals were treated by daily administration of the product for a total of 10 days. Activity was determined by comparison of the tumor size in test animals to the size in control animals which received no treatment after implantation of the tumor. Each test group consisted of ten animals and results were expressed as the average of the tumor size comparisons in each animal. Table 1 shows the dose-response relationship of L-asparaginase in this test system. In the table, column 1 lists the dose in I.U. per mouse at which the drug was given daily; column 2 shows the route of administration, intraperitoneal (I.P.), intramuscular (I.M.), or subcutaneous (S.C.); column 3 indicates the activity of the drug in the test system, the first number representing the percent reduction in tumor size over the control animals and the number in parentheses showing the number of survivors in each test group at the end of the test period. None of the ten control animals survived the test period.

TABLE 1

| Dose, I.U./mouse: | Route of administration | Activity |
| --- | --- | --- |
| 1.0 | I.P. | 100(8) |
| 0.5 | I.P. | 62(8) |
| 0.25 | I.P. | 42(10) |
| 0.10 | I.P. | 0 |
| 1.0 | I.M. | 100(10) |
| 0.5 | I.M. | 91(10) |
| 0.25 | I.M. | 50(10) |
| 0.10 | I.M. | 28(9) |
| 1.0 | S.C. | 100(10) |
| 0.5 | S.C. | 35(10) |
| 0.25 | S.C. | 53(10) |
| 0.10 | S.C. | 0 |

We claim:
1. In the method for fermenting *E. coli* in a nutrient medium to obtain L-asparaginase, the improvements which consist of aerobically fermenting the organism for a period of about 5 to about 10 hours, adjusting to pH 7–8, anaerobically aging the fermentation mixture for about 30 to about 90 minutes prior to harvest, and adding at a time prior to the anaerobic aging period an amount of glycolyzable carbohydrate sufficient to cause the concentration thereof to be about 2.5 to about 8 g. per liter at the initial point of the anaerobic aging period.

References Cited

Schwartz et al., Proceedings, National Academy Sciences, 56, pp. 1516–1519, 1966.

Cedar et al., Journal of Biological Chemistry, vol. 242, No. 10, pp. 3753–3755, August 1967.

LIONEL M. SHAPIRO, Primary Examiner